United States Patent
Zhang et al.

(10) Patent No.: US 10,868,466 B2
(45) Date of Patent: *Dec. 15, 2020

(54) SENSE RESISTOR FAULT DETECTION

(71) Applicants: DIALOG SEMICONDUCTOR INC., Campbell, CA (US); DIALOG SEMICONDUCTOR (UK) LIMITED, London (GB)

(72) Inventors: Xiaoyong Zhang, Campbell, CA (US); Frank Kronmuller, Nabern (DE); Jiandong Zhang, Campbell, CA (US); Lijie Chen, Tianjin (CN); Honglai Wang, Tianjin (CN); Yimin Chen, Campbell, CA (US)

(73) Assignees: DIALOG SEMICONDUCTOR INC, Campbell, CA (US); DIALOG SEMICONDUCTOR (UK) LIMITED, London (GB)

( * ) Notice: Subject to any disclaimer, the term of this patent is extended or adjusted under 35 U.S.C. 154(b) by 53 days.

This patent is subject to a terminal disclaimer.

(21) Appl. No.: 16/044,470

(22) Filed: Jul. 24, 2018

(65) Prior Publication Data

US 2018/0367045 A1 Dec. 20, 2018

Related U.S. Application Data

(62) Division of application No. 15/627,253, filed on Jun. 19, 2017, now Pat. No. 10,033,285.

(51) Int. Cl.
*H02M 1/32* (2007.01)
*H02M 3/335* (2006.01)
*H02M 1/08* (2006.01)
*H02H 7/12* (2006.01)
*H02M 1/00* (2006.01)
*H02H 3/04* (2006.01)

(52) U.S. Cl.
CPC ............... *H02M 1/32* (2013.01); *H02M 1/08* (2013.01); *H02M 3/33507* (2013.01); *H02M 3/33523* (2013.01); *H02H 3/044* (2013.01); *H02H 7/1213* (2013.01); *H02M 2001/0009* (2013.01); *H02M 2001/0025* (2013.01)

(58) Field of Classification Search
CPC .. H02M 1/08; H02M 1/32; H02M 2001/0009; H02M 2001/0025
See application file for complete search history.

(56) References Cited

U.S. PATENT DOCUMENTS 5,291,073 A * 3/1994 Lewandowski ........ G01R 21/02
324/106
5,800,461 A 9/1998 Menken
(Continued)

*Primary Examiner* — Yusef A Ahmed
(74) *Attorney, Agent, or Firm* — Haynes and Boone, LLP

(57) ABSTRACT

A power system and related methods provide sense resistor fault detection and safe operation of switching power converters and connected devices such as portable electronic devices powered by the switching power converter. The power system detects an open circuit or short circuit condition of the sense resistor and controls output current of the switching power converter to ensure safe operating conditions of the power system and connected equipment. The power system can also detect initial inrush current of the connected equipment and detect a duty cycle of the switching power converter to positively detect a short circuit condition of the sense resistor.

6 Claims, 4 Drawing Sheets

(56) References Cited

U.S. PATENT DOCUMENTS

| | | | |
|---|---|---|---|
| 6,188,588 B1 | 2/2001 | Hemena | |
| 6,507,179 B1* | 1/2003 | Jun | G05F 3/30 |
| | | | 323/313 |
| 7,940,535 B2* | 5/2011 | Itoh | H05B 41/2882 |
| | | | 315/158 |
| 8,976,543 B1* | 3/2015 | Zheng | H02M 1/38 |
| | | | 363/17 |
| 9,318,963 B2* | 4/2016 | Yao | H02M 3/33523 |
| 9,331,589 B2 | 5/2016 | Shi | |
| 9,477,252 B2 | 10/2016 | Gambetta | |
| 9,768,676 B1* | 9/2017 | Shen | H02M 3/156 |
| 9,906,143 B1* | 2/2018 | Yu | H02M 3/33507 |
| 2003/0222633 A1* | 12/2003 | Hwang | H02M 1/36 |
| | | | 323/282 |
| 2004/0136207 A1 | 7/2004 | Havanur | |
| 2006/0018135 A1* | 1/2006 | Yang | H02M 3/33592 |
| | | | 363/21.14 |
| 2009/0016086 A1* | 1/2009 | Huynh | H02M 3/33523 |
| | | | 363/80 |
| 2009/0195230 A1* | 8/2009 | Adkins | H02M 3/156 |
| | | | 323/282 |
| 2009/0244934 A1 | 10/2009 | Wang | |
| 2009/0316441 A1* | 12/2009 | Hu | H02M 3/33592 |
| | | | 363/21.06 |
| 2010/0195254 A1* | 8/2010 | Cohen | H02M 1/32 |
| | | | 361/18 |
| 2010/0265741 A1* | 10/2010 | Usui | H02M 1/4258 |
| | | | 363/21.12 |
| 2013/0272036 A1* | 10/2013 | Fang | H02M 3/33507 |
| | | | 363/21.17 |
| 2014/0112028 A1* | 4/2014 | Fahlenkamp | G01R 22/06 |
| | | | 363/21.12 |
| 2014/0112030 A1* | 4/2014 | Fahlenkamp | H02M 3/33507 |
| | | | 363/21.14 |
| 2014/0133186 A1* | 5/2014 | Balakrishnan | H02M 3/33523 |
| | | | 363/17 |
| 2014/0160810 A1* | 6/2014 | Zheng | H02M 3/33576 |
| | | | 363/21.17 |
| 2014/0210377 A1 | 7/2014 | Knoedgen | |
| 2014/0218976 A1* | 8/2014 | Luo | H02M 1/08 |
| | | | 363/21.01 |
| 2014/0268911 A1* | 9/2014 | Telefus | H02M 3/33523 |
| | | | 363/21.08 |
| 2014/0268919 A1* | 9/2014 | Yao | H02M 3/33523 |
| | | | 363/21.15 |
| 2015/0214851 A1* | 7/2015 | Lin | H02M 3/33592 |
| | | | 363/21.14 |
| 2015/0229223 A1* | 8/2015 | Cao | H02M 3/33515 |
| | | | 363/21.13 |
| 2015/0333641 A1* | 11/2015 | Gong | H02M 3/33592 |
| | | | 363/21.14 |
| 2016/0020700 A1* | 1/2016 | Zhang | H02M 3/33576 |
| | | | 363/21.16 |
| 2016/0020703 A1* | 1/2016 | Gong | H02M 3/33592 |
| | | | 363/21.14 |
| 2016/0072399 A1* | 3/2016 | Kikuchi | H02M 3/33592 |
| | | | 363/21.14 |
| 2016/0261204 A1* | 9/2016 | Kikuchi | H02M 3/33523 |
| 2016/0266598 A1* | 9/2016 | Wong | G05F 3/30 |
| 2016/0291631 A1* | 10/2016 | Sen | H02M 3/158 |
| 2016/0301314 A1* | 10/2016 | Polivka | H02M 3/33507 |
| 2016/0322834 A1* | 11/2016 | Carpenter, Jr. | H02J 7/007 |
| 2016/0359421 A1 | 12/2016 | Lin | |
| 2017/0117812 A1* | 4/2017 | Furtner | H02M 3/33515 |
| 2017/0126138 A1* | 5/2017 | Cao | H02M 3/33515 |
| 2017/0207711 A1* | 7/2017 | Balakrishnan | H02M 1/36 |
| 2017/0338746 A1* | 11/2017 | Chen | H02M 1/08 |
| 2018/0019587 A1* | 1/2018 | Chen | H02H 7/1213 |

* cited by examiner

SENSE RESISTOR FAULT DETECTION

CROSS-REFERENCE TO RELATED APPLICATIONS

This application is a divisional of U.S. patent application Ser. No. 15/627,253, filed Jun. 19, 2017.

TECHNICAL FIELD

This application relates to switching power converters and, more specifically, to switching power converters included in power adapters for portable equipment.

BACKGROUND

Portable electronic devices such as cellular telephones and laptop require a power adapter (typically a switching power converter) for recharging their batteries by converting the AC voltage and current from the AC mains into a regulated DC voltage or current for battery recharging. Due to the isolation provided by its transformer, a flyback switching power converter is typically selected as the power adapter for portable electronic devices. For safety and regulation, the flyback converter monitors the current it delivers to the load such as by including a secondary-side sense resistor in series with the transformer's secondary winding to measure the current delivered to the load. The sense resistance is typically quite low (e.g., 10 mΩ) to minimize its resistive power loss. At an output current of 5 A, such a sense resistor resistance would produce a 50 mV voltage drop across its terminals.

The voltage across the sense resistor during normal operation thus poses no risk to the sense resistor monitoring circuitry that measures the sense resistor voltage to determine the output current. However, a mishap or failure may lead to an open circuit at one of the sense resistor's terminals. In the case of an external sense resistor that is not integrated with the secondary-side controller for the flyback converter, the open circuit may result from a breakage of the solder used to mount the sense resistor to a printed circuit board or a break in the related trace of the printed circuit board. Modern lead-free solders that are designed to be more environmentally friendly tend to be more brittle than traditional lead-based solders and are thus more prone to such a failure. If the power converter tries to deliver current to the load with an open-circuited sense resistor, a much greater voltage can result across the sense resistor terminals than what the sense resistor monitoring circuit is designed for. In particular, the resulting high voltage can damage the internal circuits of the power converter controller, including its electrostatic discharge (ESD) circuits.

In addition to open-circuit-based faults, the sense resistor may also be short-circuited. In such a case there is no voltage across the terminals of the sense resistor with the resulting lack of voltage informing the controller that there is no current to the load. The controller may operate to supply more and more current to the load until damage occurs to the switching power converter, the load, or both.

Accordingly, there is a need in the art for a switching power converter controller that can detect both open-circuit faults and short-circuit faults for the sense resistor and that can adjust the operation of the switching power converter in response to the fault detection.

SUMMARY

To address the need in the art for sense resistor fault detection in switching power converters, systems and methods are provided for detecting an open-circuit fault or a short-circuit fault for a sense resistor used for sensing the output current supplied by a switching power converter. Should either of these faults be detected, an output switch may be opened to disconnect the switching power converter from a load. The sense resistor fault detection disclosed herein is compatible with any switching power converter such as a flyback converter, a boost converter, a buck converter, or a buck-boost converter. During normal operation (no fault condition), the switching power converter monitors a voltage across the sense resistor to measure the output current being delivered to the load.

To perform the open-circuit detection, an amplifier amplifies the voltage across the sense resistor to produce a detection signal that is compared to an open-circuit threshold. During normal operation, the detection signal will not exceed the open-circuit threshold and is used in a conventional fashion to monitor the output current from the switching power converter. But the detection signal will exceed the open-circuit threshold in the presence of an open-circuit fault at the sense resistor. In response to the detection of the open-circuit fault, a logic circuit opens the output switch for the switching power converter to prevent an output current from driving the load.

To perform the short-circuit detection, a logic circuit determines whether a duty cycle of a power switch for the switching power converter exceeds a short-circuit threshold. Should the duty cycle exceed the short-circuit threshold while the amplifier detects no voltage across the sense resistor, a short-circuit fault is deemed to be detected. In response to the short-circuit fault, a logic circuit opens the output switch to prevent output current from driving the load. In this fashion, both an open-circuit fault and a short-circuit fault at the sense resistor is detected so that the user may be assured of safe operation of the switching power converter. These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems, devices, and methods are provided for sense resistor fault detection and safe operation of switching power converters which may be used as power adapters, battery chargers, or other power supply systems. Measuring output current from a switching power converter through a sense resistor is a widely used technique but can lead to unsafe operation of the switching power converter and its load if the sense resistor terminals are either a short circuited or open circuited. The disclosed embodiments prevent such unsafe operation in response to detecting either short-circuit fault or an open-circuit fault at the sense resistor by, for example, opening an output switch that disconnects the switching power converter from the load.

The following discussion will be directed to a flyback converter embodiment but it will be appreciated that the sense resistor fault detection circuits and techniques disclosed herein may be applied to other types of switching power converters such as a buck converter, a boost converter, or a buck-boost converter. The sense resistor in a flyback converter is in series with the secondary winding of the flyback converter's transformer. Proper operation of the flyback converter depends on the integrity of the sense resistor, which is used to detect the output current. For example, if the sense resistor voltage indicates that the output current is zero or close to zero due to a short-circuit fault but the power switch is being cycled such that current is being delivered to the load, a current overload condition may not be correctly signaled to the primary side controller. The primary side controller may then continue supplying too much current to the load, resulting in undesirable consequences such as damage to the power system, the device, and even catastrophe such as fire and property damage. Conversely, an open-circuit fault results in an anomalously high sense resistor voltage that may harm the internal circuitry of the secondary controller. The open-circuit fault and short-circuit fault detection techniques disclosed herein advantageously protect the flyback converter and its load from these sense resistor fault conditions.

Figure 1:
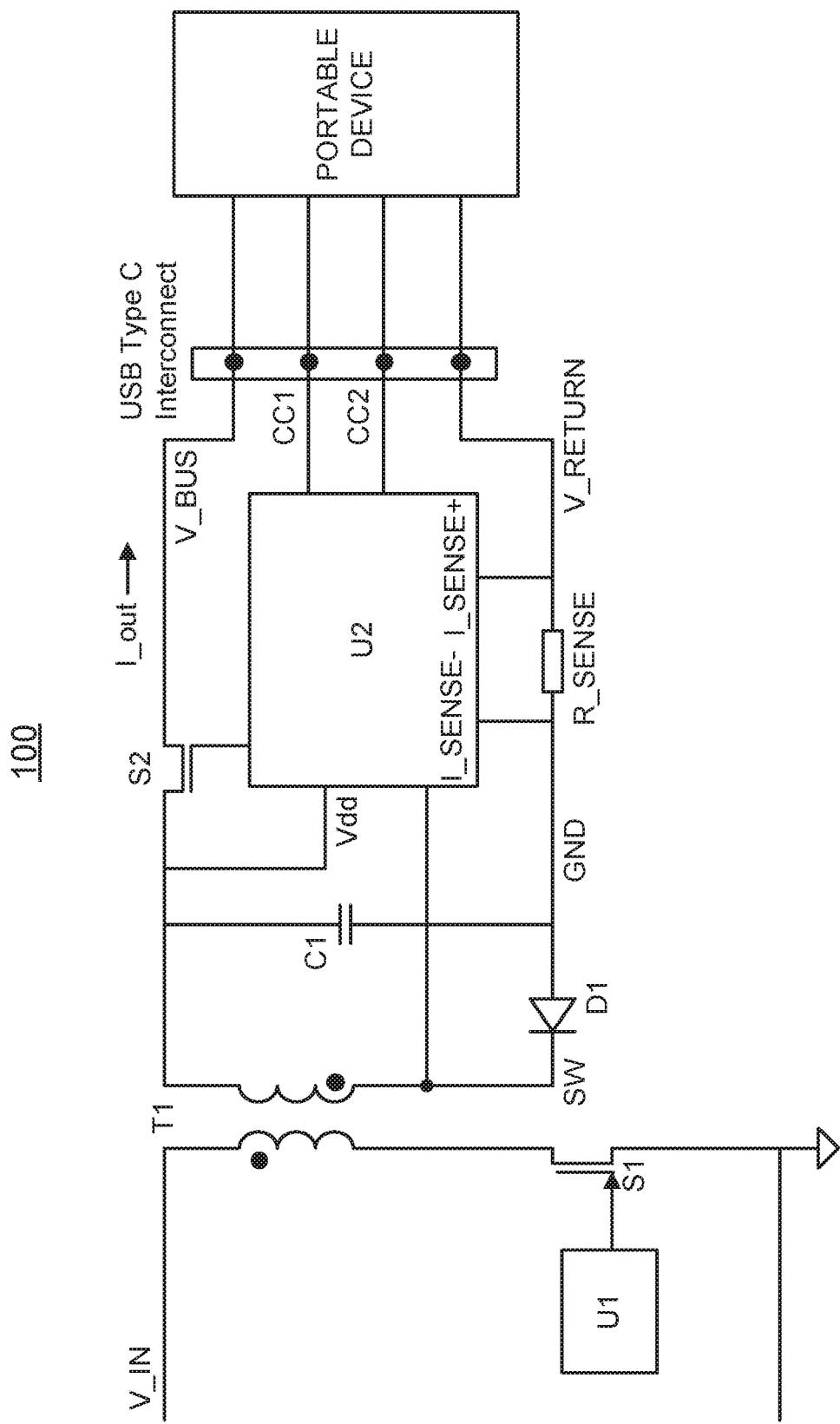
FIG. 1 is a circuit diagram of a switching power converter including a secondary controller configured to detect an open-circuit fault and a short-circuit fault at a secondary-side sense resistor in accordance with an aspect of the disclosure.

An example flyback converter 100 configured for sense resistor fault detection is shown in FIG. 1. Flyback converter 100 includes a transformer T1 having a primary winding in series with a power switch transistor (S1). When a primary controller (U1) switches on power switch transistor S1, an input voltage V_IN causes a primary current to begin increasing through the transformer's primary winding. While the primary current flows, an output diode D1 at the secondary side of transformer T1 is reversed biased such that no secondary current flows through the transformer's secondary winding. When primary controller U1 switches off power switch transistor S1, output diode D1 becomes forward-biased such that the secondary current may flow and charge an output capacitor C1. During normal operation, a secondary controller U2 maintains an output switch transistor S2 on so that an output current I_out may flow from flyback converter 100 into a power lead of a Universal Serial Bus (USB) cable or interconnect so that the output current I_out and an output voltage V_BUS may be delivered to a load (portable device).

Secondary controller U2 monitors the data terminals CC1 and CC2 in the USB interface to monitor when the portable device is connected and ready to receive power. Secondary controller U2 couples through a communication channel (not illustrated) such as an optocoupler to communicate the presence of the load to primary controller U1, which may begin cycling power switch S1 accordingly to regulate the output voltage V_BUS and also the output current I_out. In an alternative embodiment, output diode D1 may be replaced by a synchronous rectifier (SR) switch transistor (not shown) and an SR controller (not shown) or secondary controller U2 is configured to control the on state and the off state of the SR switch transistor in response to the power switch transistor S1 on and off states. The power switch transistor S1, output switch transistor S2, and the SR switch transistor of the alternative embodiment may each be a field-effect transistor (FET) device (e.g., a metal oxide field-effect transistor (MOSFET) device), a bipolar junction transistor (BJT) device, or other appropriate switch.

To monitor the output current I_out delivered to the portable device, a secondary-side sense resistor R_SENSE is connected in series with ground return from the portable device (alternatively, sense resistor may be connected in series with the V_BUS line). The secondary controller U2 may thus sense the voltage across a pair of terminals I_SENSE− and I_SENSE+ for the sense resistor to monitor the output current using Ohm's law. To minimize the resulting $I^2R$ power losses, the sense resistor resistance is typically fairly low such as 10 m$\Omega$. A five amp output current thus produces a voltage of 50 millivolts across the sense resistor. But in the event of an open-circuit fault at either or both of the I_SENSE+ and I_SENSE− terminals of the sense resistor, the sense resistor voltage may raise markedly higher than the expected normal operating range, potentially causing damage to secondary controller U2 and even to its electrostatic discharge (ESD) protection circuitry.

Secondary controller U2 can detect such open-circuit faults of sense resistor R_SENSE by determining whether the sense resistor voltage is too high. In response to the open-circuit fault detection, secondary controller U2 turns off output switch transistor S2 to protect flyback converter 100 and the portable device. For example, a logic circuit of controller U2 may be configured to turn off the output power switch transistor S2 when the voltage drop across the sense resistor is greater than a pre-determined open-circuit threshold value—such as 50 mV—depending on the particular components and application of power system 100.

Secondary controller U2 also can detect a short-circuit fault at the sense resistor in several different embodiments. A first embodiment for the secondary controller U2 exploits the initial inrush of the output current when output switch transistor S2 is first turned and portable device is connected to the flyback converter. Secondary controller U2 can detect this inrush current from the voltage readings across the sense resistor. If the sense resistor is not shorted, a voltage drop will appear across the sense resistor and the voltage readings at the sense resistor terminals I_SENSE+ to I_SENSE− will indicate a normal load current to somewhat higher than normal load current through the sense resistor for the inrush period, followed by normal current readings from the sense resistor voltage. Secondary controller U2 may include a logic circuit that is programmed or configured to detect this expected behavior following the switching on of the output switch transistor S2. For example, the logic circuit may be configured to determine that a short-circuit fault does not exist if the portable device is connected and the output current as measured by the sense resistor voltage rises above a pre-determined threshold (referred to herein as an "inrush threshold") during a pre-determined time period after S2 is switched on.

Conversely, if the sense resistor voltage stays below the inrush threshold during the predetermined time period after the output switch transistor S2 is switched on and the load is connected, the logic circuit detects the short-circuit fault. The logic circuit may be further configured to respond to this short-circuit fault detection by switching off the output switch transistor S2 to prevent damage to the flyback converter 100 and the load.

In an alternative embodiment method, secondary controller U2 may sense a voltage of a node SW at the cathode of the output diode D1. Should the output diode be replaced by an NMOS synchronous rectifier (SR) switch transistor, the node SW would be the drain of the SR switch transistor. In either case, the voltage of the circuit node SW will pulse high while the secondary current is not flowing. Secondary controller U2 may thus determine the duty cycle for the pulsing of the SW node voltage as a proxy for the duty cycle for the cycling of power switch S1. As the duty cycle of the power switch S1 cycling increases from zero, the output current should also increase. Secondary controller U2 may thus determine whether the duty cycle for the pulsing of the SW node voltage exceeds a duty cycle threshold value (e.g., 10% of the maximum duty cycle) and thus expect that the output current should also be at some appreciable value. But if the duty cycle for the SW node voltage exceeds the duty cycle threshold and the sense resistor voltage is zero or relatively low, a short-circuit fault is detected. Thus, if the monitored duty cycle is above the pre-set duty cycle threshold (indicating that the load current has reached or is above the estimated threshold value) but the sense resistor voltage is still reporting no current or close to zero output current, then the discrepancy indicates that sense resistor is shorted across its terminals I_SENSE+ and I_SENSE−. Secondary controller U2 may respond to the short-circuit fault detection by switching off output switch transistor S2 to prevent damage to flyback converter 100 and its load.

Figure 2A:
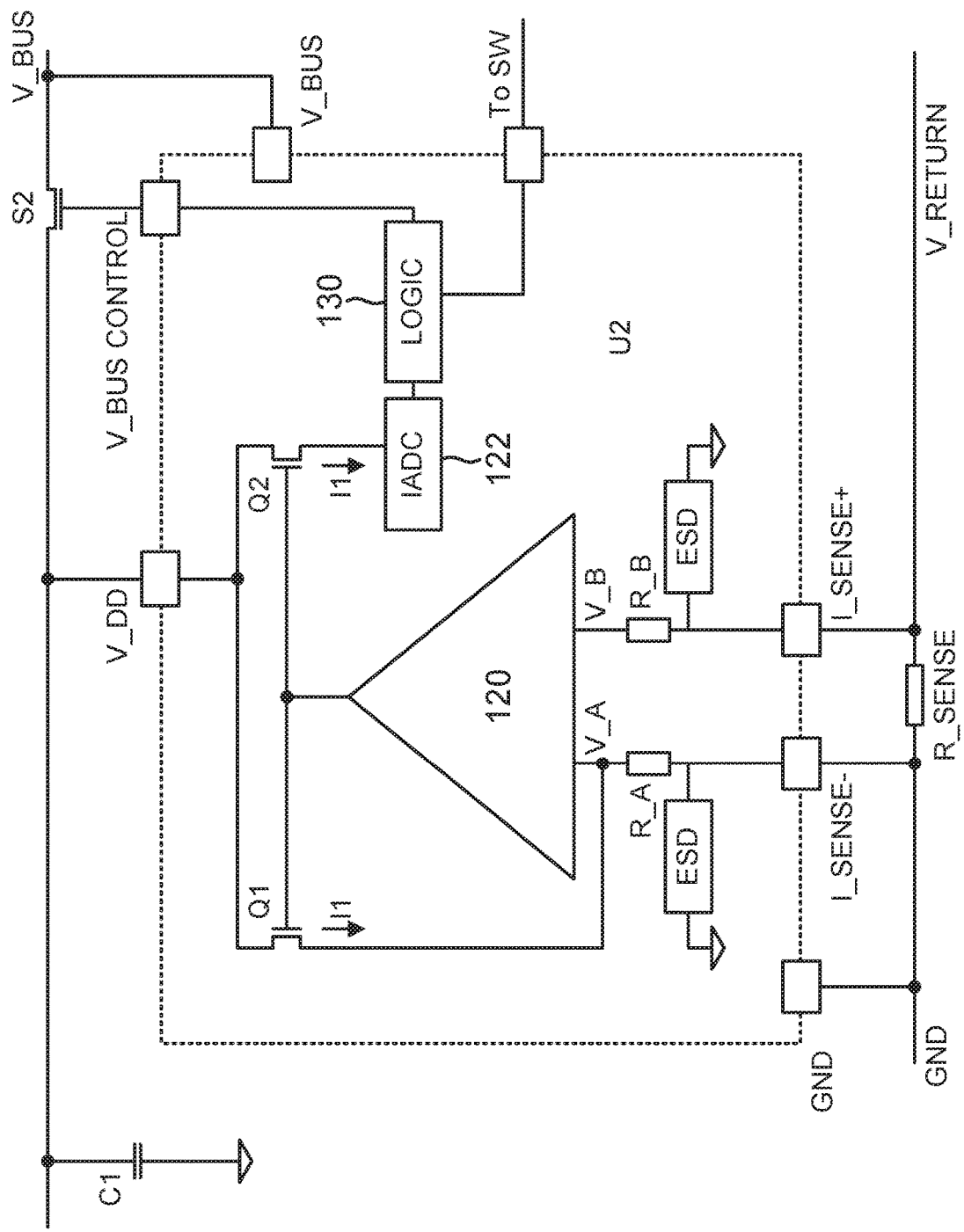
FIG. 2A is a circuit diagram for the secondary controller of FIG. 1 in which an analog circuit is used to detect the open-circuit fault in accordance with an aspect of the disclosure.

The detection of the open-circuit fault may be performed using either analog or digital circuit architectures. An example analog architecture for secondary controller U2 (e.g., an integrated circuit) is shown in FIG. 2A. Secondary controller U2 may include an amplifier 120 (e.g., an operational amplifier) having inputs V_A and V_B connected to input resistors R_A and R_B, respectively. Input resistor R_A connects to the I_SENSE− terminal for the sense resistor whereas input resistor R_B connects to the I_SENSE+ terminal for the sense resistor. Secondary controller U2 may be protected by electrostatic discharge (ESD) circuitry at the I_SENSE− and I_SENSE+ terminals. Power for secondary controller U2 is received at a terminal V_DD whereas ground is received at a terminal GND. Amplifier 120 drives the gates of a pair of matched NMOS current source transistors Q1 and Q2 that both have their drains coupled to the VDD terminal. Depending upon their gate voltage, transistor Q1 and Q2 will each conduct a current I1 into its source. The source of transistor Q1 connects to an input of a current analog-to-digital converter (IADC) 122. But the source of transistor Q2 connects to input V_A of amplifier 120. During normal operation, amplifier 120 can thus use current I1 to correct for the sense resistor voltage in that current I1 will increase the voltage of input V_A until it equals the voltage for input V_B. During normal operation, the digital output of IADC 122 will thus represent the value of the output current.

Depending upon the expected range of the output current and the sense resistor resistance, the digital output of IADC 122 will also have some expected or normal operation range. But in the presence of an open-circuit fault, the voltage across terminals I_SENSE− and ISENSE+ may raise above the expected operating range. Amplifier 120 will then have to increase the gate voltages for transistors Q1 and Q2 so that the current I1 can offset this increase by increasing the voltage at terminal V_A. The digital output from IADC 122 will then reflect this increase in the current I1. A logic circuit 130 is configured to determine whether the digital output (which functions as a proxy for the sense resistor voltage itself) exceeds the open-circuit threshold to detect the open-circuit fault. In response to this detection, logic circuit 130 switches off output switch transistor S2 to isolate the load from the output current.

Logic circuit 130 also may monitor the voltage at node SW to determine its duty cycle as discussed above. Should the duty cycle exceed the short-circuit threshold value while the output of IADC 122 indicates that there is little or zero output current despite the connection to the load, logic circuit 130 switches off switch transistor S2 to protect flyback converter 100 and the load from any damage that would result from an excessively-high output current.

Figure 2B:
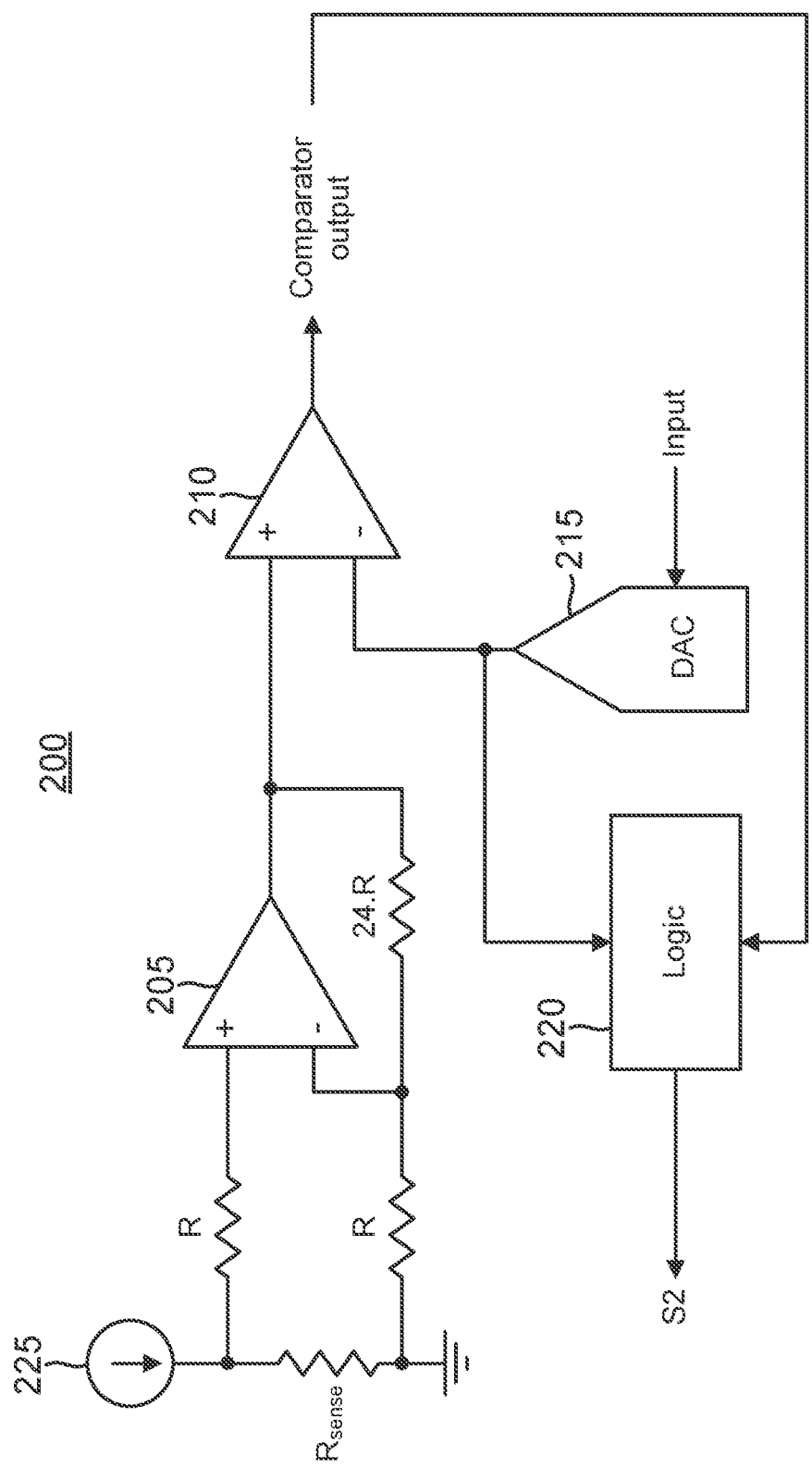
FIG. 2B is a circuit diagram for the secondary controller of FIG. 1 in which a digital circuit is used to detect the open-circuit fault in accordance with an aspect of the disclosure.

A digital architecture for a secondary controller U2 200 with regard to detecting open-circuit faults is shown in FIG. 2B. The output current is represented by current source 225, which drives the sense resistor Rsense accordingly. Resistors R are equivalent to resistors R_A and R_B discussed with regard to FIG. 2A and thus couple the sense resistor voltage to an amplifier 205. A feedback resistor 24R that has, for example, twenty-four times the resistance of resistors R couples between the output of amplifier 205 and its negative input. The output voltage of amplifier 205 will thus equal twenty-four (or some other suitable gain factor) times the sense resistor voltage. Should the sense resistor voltage thus range from zero to 50 mV, the output voltage of amplifier 205 will range from zero to 1.2 V. This output voltage is received at a positive input of a comparator 210. So long as the positive input voltage for comparator 210 is higher than a negative input voltage, a comparator output signal from comparator 205 will be a binary high (driven to the power supply voltage VDD).

A digital-to-analog converter (DAC) 215 drives the negative input of comparator 215. A logic circuit 220 controls an input signal for DAC 215 such that its output sweeps through the expected range for the output voltage for amplifier 205 (e.g., from zero to 1.2 V) but also through an anomalously high voltage range (e.g., to 2 V or higher). When the output from DAC 215 is increased until it equals the output voltage for amplifier 205, the comparator output signal will go low, which is received at logic circuit 220. Logic circuit then determines the output of DAC 215 as triggered by the transition in the comparator output signal and compares the DAC output to a threshold value. The DAC output thus functions as an amplified proxy for the sense resistor voltage. Should the DAC output exceed an open-circuit threshold (e.g., 1.25 V for the expected ranges discussed above), logic circuit 220 switches off the switch transistor 220.

Figure 3:
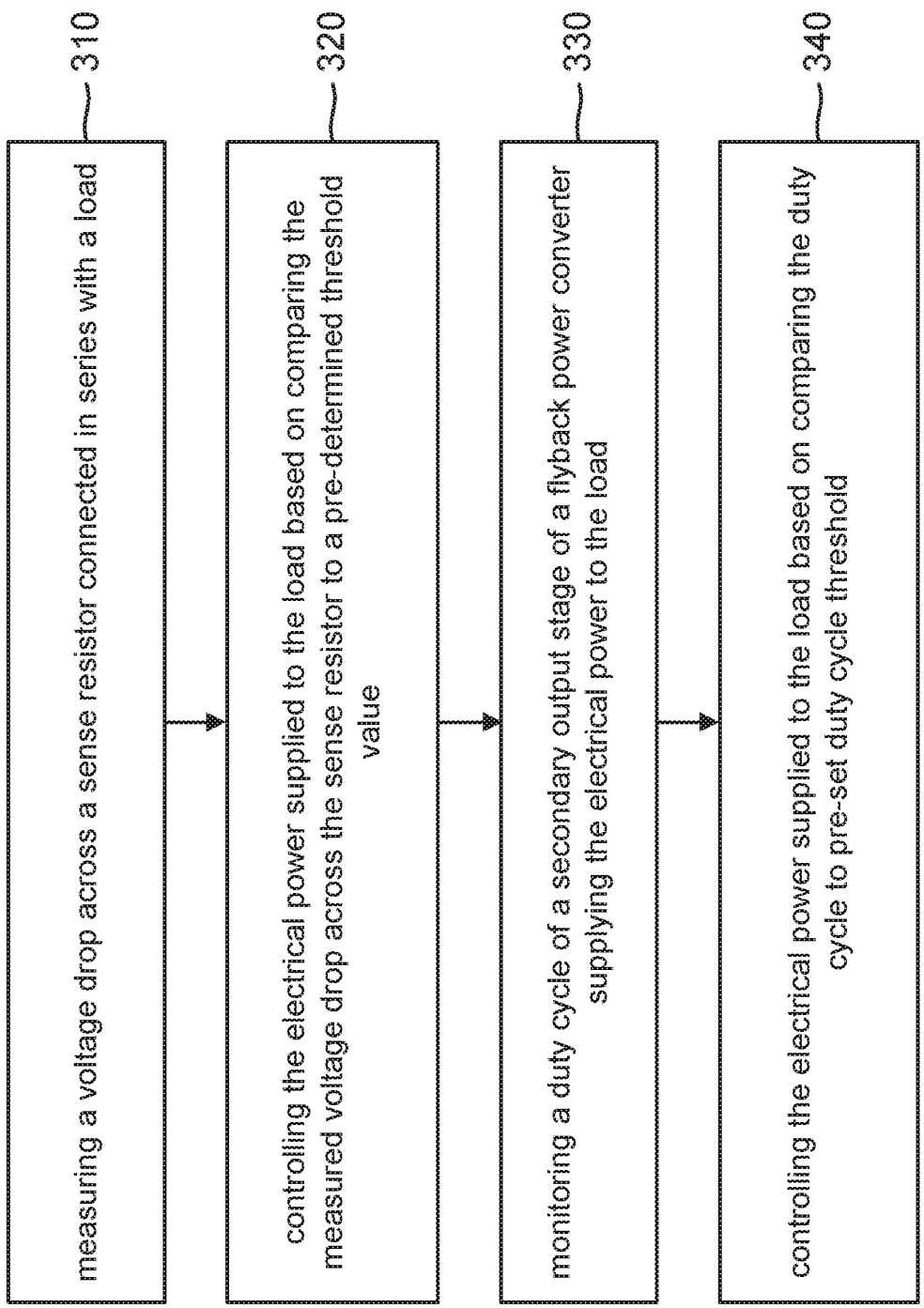
FIG. 3 is a flowchart for an example of a method of power system fault detection in accordance with an aspect of the disclosure.

A method of operation of secondary controller U2 will now be discussed with reference to the flowchart shown in FIG. 3. The method begins with an act 310 of measuring a voltage drop across a sense resistor connected in series with a load.

Producing a digital value corresponding to the load current through R_SENSE using analog-to-digital converter IADC 122 and passing the digital value to logic circuit 130 is an example of act 310. In this example, sense resistor R_SENSE is connected to terminals I_SENSE− and I_SENSE+ to be in series with the load connected to V_BUS and V_RETURN as seen in FIGS. 1 and 2. The voltages at terminals I_SENSE− and I_SENSE+ drive the inputs of operational amplifier 120 which drives matching transistors Q1 and Q2 to produce current I1 corresponding the voltage drop across R_SENSE and provide I1 as an input to IADC 122.

The method also includes an act 320 of controlling the electrical power supplied to the load based on comparing the measured voltage drop across the sense resistor to a predetermined threshold value. Comparing the digital value provided to logic 130 by IADC 122 to a pre-determined threshold value and using logic 130 to drive the gate voltage of output transistor S2 to switch power to the load (e.g. portable device shown in FIG. 1) on and off is an example of act 320.

The method also includes an act 330 of monitoring a duty cycle of a secondary output stage of a flyback power converter supplying the electrical power to the load. Providing an input to logic 130 from a node SW of the secondary output stage of flyback power converter 100 is an example of act 330.

The method also includes an act 340 of controlling the electrical power supplied to the load based on comparing the duty cycle to a pre-set duty cycle threshold. Using logic 130 to drive the gate voltage of output transistor S2 to switch power to the load on and off based on whether the duty cycle has reached or is above the pre-set duty cycle threshold but the voltage across the I_SENSE+ and I_SENSE− terminals is still below a pre-determined threshold is an example of act 340.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A secondary controller for a flyback converter, comprising;
    an amplifier configured to amplify a sense resistor voltage across a sense resistor connected in series with a secondary winding in the flyback converter to produce an amplified sense resistor voltage;
    a digital-to-analog converter (DAC) configured to convert an input signal into an analog DAC output voltage;
    a comparator configured to compare the amplified sense resistor voltage to the analog DAC output voltage to produce a transition in a comparator output signal; and
    a logic circuit configured to increase the input signal so that the analog DAC output voltage is increased across a voltage range and to switch off an output power switch for the flyback converter responsive to the analog DAC output voltage exceeding an open-circuit threshold at the transition in the comparator output signal, the logic circuit being further configured to compare a duty cycle for a terminal voltage of the secondary winding to a duty-cycle threshold and to turn off the output power switch based on detecting a short circuit condition when the duty cycle is above the duty-cycle threshold and the sense resistor voltage is below a first threshold value.

2. The secondary controller of claim 1, further comprising:
    a data cable interface for connecting to a mobile device, wherein the secondary controller is configured to alert a primary controller when the secondary controller detects the mobile device through a data channel in the data cable interface.

3. The secondary controller of claim 2, wherein the data cable interface is a Universal Serial Cable (USB) interface.

4. The secondary controller of claim 2, wherein the data cable interface is a Lightning cable interface.

5. A method, comprising:
    driving an output current to a load from a flyback converter;
    conducting the output current through a sense resistor to form a sense resistor voltage across the sense resistor;
    increasing a digital input to a digital-to-analog converter (DAC) to produce an increasing DAC output voltage that increases across a voltage range;
    amplifying the sense resistor voltage to form an amplified sense resistor voltage;
    determining an open-circuit fault for the sense resistor responsive to the DAC output voltage exceeding an open-circuit threshold when the DAC output voltage equals the amplified sense resistor voltage;
    switching off an output switch for the flyback converter responsive to the open-circuit fault;
    comparing a duty cycle for a terminal voltage of a secondary winding to a duty-cycle threshold; and
    switching off the output power switch based on detecting a short circuit condition when the duty cycle is above the duty-cycle threshold and the sense resistor voltage is below a first threshold value.

6. A secondary controller for a flyback converter, comprising;
    an amplifier configured to amplify a sense resistor voltage across a sense resistor connected in series with a secondary winding in the flyback converter to produce an amplified sense resistor voltage;
    a digital-to-analog converter (DAC) configured to convert an input signal into an analog DAC output voltage;
    a comparator configured to compare the amplified sense resistor voltage to the analog DAC output voltage to produce a transition in a comparator output signal; and
    a logic circuit configured to increase the input signal so that the analog DAC output voltage is increased across a voltage range and to switch off an output power switch for the flyback converter responsive to the analog DAC output voltage exceeding an open-circuit threshold at the transition in the comparator output signal, the logic circuit is further configured to determine a short-circuit fault responsive to the amplified sense resistor voltage being less than an inrush threshold during a pre-determined time period following a switching on of the output power switch.

\* \* \* \* \*